T. CARROLL.
Transplanters.

No. 152,328. Patented June 23, 1874.

Witnesses
John L. Boone
C. M. Richardson

Inventor
Timothy Carroll
by Dewey & Co
Attys

UNITED STATES PATENT OFFICE.

TIMOTHY CARROLL, OF ANAHEIM, CALIFORNIA.

IMPROVEMENT IN TRANSPLANTERS.

Specification forming part of Letters Patent No. 152,328, dated June 23, 1874; application filed April 27, 1874.

*To all whom it may concern:*

Be it known that I, TIMOTHY CARROLL, of Anaheim, Los Angeles county, State of California, have invented a Device for Raising and Transplanting Trees and Shrubs; and I do hereby declare the following description and accompanying drawings are sufficient to enable any person skilled in the art or science to which it most nearly appertains to make and use my said invention without further invention or experiment.

My invention relates to a novel device for raising trees, shrubs, and flowers from the earth, for the purpose of moving or transplanting them; and it consists of certain details of construction, as hereinafter more fully described and claimed.

Figure 1:
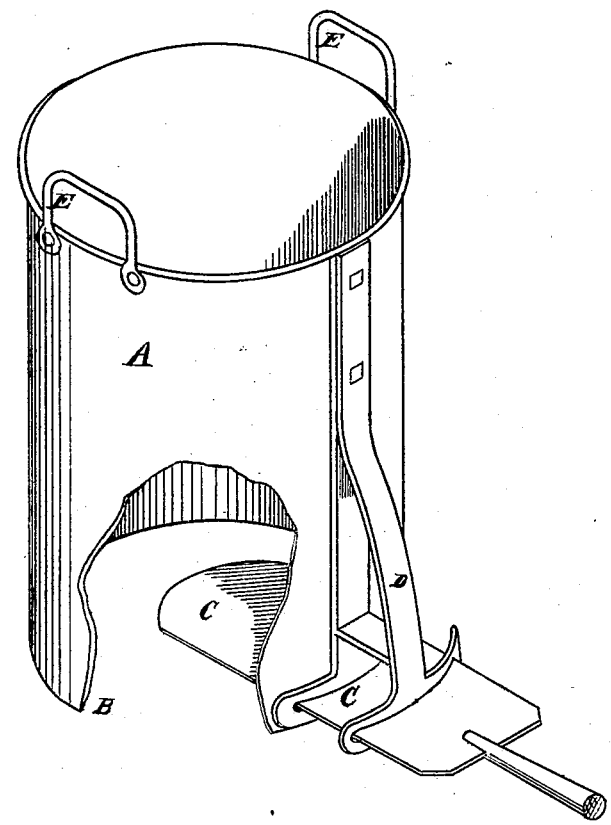
Figure 2:
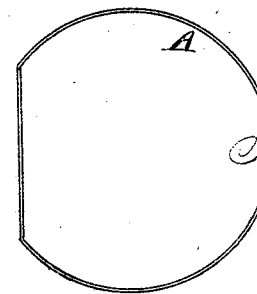

Referring to the accompanying drawing for a more complete explanation of my invention, Figure 1 is a perspective view of my device.

A is a box or shell without bottom or top, which may be made of any desired shape; but I have found that one made nearly or quite cylindrical in form to be very satisfactory. The lower edge, B, of this box, which is of metal, is sharpened off, so as to enter the soil as easily as possible.

In transplanting or removing young trees in nurseries, it will first be necessary to dig a hole near the tree as deep as the tool is to be driven, and just at the edge of the space it will inclose. The implement is then placed over the tree so as to surround it, and driven into the ground until it is sufficiently low to clear the roots. At one side of the bottom of the box A a slot is made, and a slide, C, is fitted to enter this slot, being driven horizontally across below the plant. The hole which was previously dug allows of the introduction of the slide C to take up the first plant; but after that the removal of each plant gives space for operating upon the next, as they are set near enough together in nurseries. The slide being driven in beneath the plant, it, with a body of undisturbed earth about its roots, can be removed and immediately transplanted, or can be boxed and transported, if desired.

In order to guide and steady the slide, an arm, D, is secured to the side of the shell or case, extending out a short distance at the bottom, and slotted in a line with the slot in the bottom of the case A, so that the slide passes through both of the slots. This bracing-arm may be so hinged as to turn up out of the way when it is necessary to box the plant up for moving. The handles E may also be folded up, if desired, for the same purpose.

By this simple device I am enabled to take up and remove trees and plants, however delicate, without any liability of destroying them; and when it is necessary to replace them in the ground in the new location the case A is set into the hole prepared for it, and the slide is withdrawn, so that the case can be lifted out, leaving the earth and plant in place.

I am aware that a transplanting device has heretofore been used having a removable bottom attached to one of its sides, and the other three sides sliding through the earth down to said bottom; hence I do not claim, broadly, a transplanting device having a removable bottom; but

Having thus described my invention, what I claim, and desire to secure by Letters Patent, is—

The shell or case A, with its cutting-edge B, and provided with the sliding plate C and guide D, substantially as and for the purpose herein described.

In witness whereof I hereunto set my hand and seal.

TIMOTHY CARROLL. [L. S.]

Witnesses:
 GEO. H. STRONG,
 JNO. L. BOONE.